Patented May 23, 1950

2,508,937

UNITED STATES PATENT OFFICE 2,508,937

4 - METHYL-8-(DIALKYL AMINOALKYL-AMINO)QUINOLINES AND METHOD FOR THEIR PRODUCTION

Kenneth N. Campbell, Portage Township, St. Joseph County, Ind., assignor, by mesne assignments, to the United States of America as represented by the Secretary of War No Drawing. Application April 8, 1946, Serial No. 660,411

3 Claims. (Cl. 260—286)

This invention relates to certain new antimalarial compounds, new intermediates for their preparation, and the method of preparing such compounds and intermediates.

The new antimalarials are 6,8-substituted lepidines represented by the following formula (1)
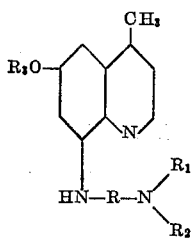

in which R represents an alkyl radical having from 2 to 8 carbon atoms which may be either branched or straight chain, $R_1$ represents hydrogen or an alkyl radical having from 1 to 6 carbon atoms, $R_2$ represents an alkyl radical having from 1 to 6 carbon atoms and which may or may not be the same as the $R_1$ substituent, and $R_3$ represents hydrogen or an alkyl radical having from 1 to 4 carbon atoms.

These new substituted lepidines have an antimalarial action which appears in comparison with plasmoquin to have advantages which are not only quantitative, but qualitative. Thus, tests on malaria in monkeys show a remarkable lack of evidence of leukopenia.

The principal new intermediates are 6-alkoxy-8-nitrolepidines represented by the formula (2)
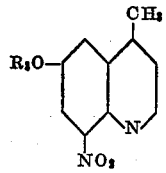

and 6-alkoxy-8-aminolepidines represented by the following formula (3)
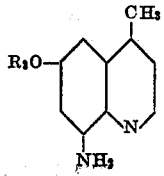

These new intermediates may be prepared by a drastic condensation of an o-nitro-p-alkoxyaniline and methylvinyl ketone, with arsenic acid and concentrated sulfuric acid. Preferably, the methylvinyl ketone is supplied by adding a compound, such as 1,3,3-trimethoxybutane (made by the addition of methyl alcohol to monovinylacetylene in the presence of a suitable catalyst as described by Killian, Hennion and Nieuwland, J. Am. Chem. Soc., vol. 56, page 1786 (1934)), β-chloroethylmethyl ketone (which may be prepared by the method of Smith and Sprung, J. Am. Chem. Soc. 65, page 1279 (1934)), or 4-methoxybutanone-2 (which may be prepared by the method of Killian, Hennion and Nieuwland, J. Am. Chem. Soc., 56, 1786 (1934)), and 4-hydroxy-2-butanone (which may be prepared by the method of White and Howard, J. Chem. Soc. (London) 1943, pages 25-31), all of which yield methylvinyl ketone under the reaction conditions. This produces a 6-alkoxy-8-nitrolepidine of Formula 2. This substituted lepidine is reduced, as with hydrogen under pressure and heat in the presence of a catalyst such as Raney nickel or with stannous chloride, to produce a 6-alkoxy-8-aminolepidine of Formula 3.

New 6-alkoxy-8-substituted lepidines of formula 1 may be prepared by condensing a 6-alkoxy-8-aminolepidine, prepared as set forth above, with an alkylamino alkyl halide or the hydrohalide thereof, which alkylamino alkyl halide has the following formula (4)
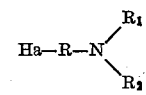

in which R, $R_1$, and $R_2$ have the same meaning as before, and Ha represents one of the halogens bromine and chlorine, to which two elements we confine the term halogen in this specification. When the halogen is attached to a secondary carbon, it is preferably bromine, to minimize danger of cyclization. The condensation may be carried out by refluxing a mixture of the reactants in a suitable solvent such as a water-alcohol mixture for several hours, desirably in the presence of a buffer such as sodium acetate. This produces a 6-alkoxy-8-substituted lepidine of Formula 1. It may be separated by diluting the reaction mixture with water, making it alkaline as with sodium or potassium hydroxide, extracting with ether, and distilling the ether extract in an inert atmosphere at a pressure of 0.5 mm. or less, with a bath temperature of about 225–250° C.

The 6-hydroxy-8-substituted lepidines of Formula 1 may be obtained by demethylation of the corresponding 6-methoxy compounds.

The substituted lepidines, produced in the form of their free bases, are desirably recovered in the form of their salts and purified as by recrystallization.

The preparation of the 8-nitro- and 8-aminolepidines of Formulas 2 and 3 is exemplified as follows:

A mixture of 170 g. of arsenic acid, 50 ml. of water, 168 g. (1.0 mol.) of o-nitro-p-methoxy aniline, and 280 g. of concentrated sulfuric acid is heated in an oil bath at 110–115° C., and 148 g. (1.0 mol.) of 1,3,3-trimethoxybutane is added dropwise in the course of about 2½ hours. The mixture is heated at 115–125° C. and stirred for an additional two hours, while methanol distills out. The reaction mixture is then cooled, poured into ice water, and filtered. The filtrate is made basic with ammonium hydroxide, which causes the formation of a reddish-brown precipitate consisting essentially of the desired 6-methoxy-8-nitrolepidine, of Formula 2. This product is seperated by filtration and is recrystallized from 2 liters of benzene. The yield is about 71 g., and the product at this stage of purification melts at 160–165° C. It may be further purified, as by recrystallization twice from benzene, to yield a product melting at about 165.5–171.5° C.; but it need not be so purified, and may be used as obtained from the first crystallization from benzene.

A mixture of 33 g. of the 6-methoxy-8-nitrolepidine, 25 ml. of absolute alcohol, 75 ml. of ethyl acetate, and 9 g. of Raney nickel is shaken with hydrogen at 50° C. and 60 lbs./sq. in. The theoretical amount of hydrogen is absorbed in about 80 minutes. The reaction mixture is filtered, and the filtrate distilled, to remove the alcohol and ethyl acetate, and recover the desired 6-methoxy-8-aminolepidine, which boils at about 164–170° C. at 3 mm. pressure. This may be recrystallized from ligroin, to yield white crystals melting at about 86.5–87.5° C.

The preparation of the new antimalarials is exemplified as follows:

*Example 1*

6 - methoxy - 8 - (6'-diethylaminohexylamino) - lepidine, represented by the following formula (5)

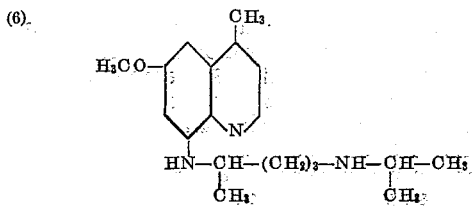

may be prepared as follows:

30 g. of diethylaminohexanol is added with shaking to 520 ml. of 48 percent hydrobromic acid, and the solution is refluxed for about six hours. It is then concentrated to a thick syrup under reduced pressure at a temperature of about 60–90° C. The syrup is taken up in water and again evaporated. The residue consists essentially of 6 - diethylaminohexyl bromide hydrobromide, which is recovered by recrystallization from a mixture of alcohol and ether. The product is obtained in good yield, and melts at 60–63° C.

A mixture of 57 g. (0.18 mol.) of diethylaminohexyl bromide hydrobromide, 28.5 g. (0.15 mol. of 6-methoxy-8-aminolepidine, 25 g. (0.3 mol.) of sodium acetate, and 90 ml. of 50 percent alcohol is refluxed for about 48 hours. The solution is poured into about 500 ml. of water and made alkaline with potassium hydroxide. This liberates as a free base the desired 6-methoxy-8-(6'-diethylaminohexylamino)-lepidine. This is recovered by extraction with ether and distillation of the ether extract in an inert atmosphere, conveniently nitrogen, at a pressure of about 0.5 mm. or less, with a bath temperature of about 225–250° C. This yields about 19.1 g. of the desired 6-methoxy-8-(6' - diethylaminohexylamino)-lepidine, boiling at about 190–200° C. at 0.05 mm. pressure.

To convert this to its dihydrochloride, the free base, dissolved in about 50 ml. of n-propanol, is titrated with propanolic hydrogen chloride. This produces a yellow crystalline precipitate, melting at about 176–178° C., which is the desired 6-methoxy - 8-(6'-diethylaminohexylamino) - lepidine dihydrochloride. This may be recrystalized from propanol, to yield a product melting at about 179–180° C.

To obtain the corresponding 6-hydroxy-8-(6'-diethylaminohexylamino)-lepidine, the 6-methoxy compound obtained above may be refluxed for about four hours with a 50 percent solution of hydrogen bromide, the reaction mixture evaporated to dryness, and the residue recrystallized from alcohol-ether. This produces the 6-hydroxy - 8 - (6' - diethylaminohexylamino) - lepidine in the form of its dihydrobromide.

*Example 2*

6 - methoxy - 8 - (1' - methyl - 4' - isopropylaminobutylamino)-lepidine, represented by the following formula (6)

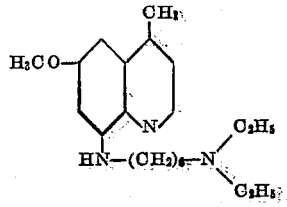

may be prepared as follows:

1-methyl-4-isopropylaminobutyl bromide hydrobromide, used in this example, is described by Elderfield et al., J. Am. Chem. Soc. 68, (1946).

A mixture of 262 g. (1 mol.) of 1-methoxy-4-isopropylaminobutyl bromide hydrobromide, 300 ml. of warm (40–50° C.) water and 363 g. (2 mol.) of 6-methoxy-8-aminolepidine is held at a temperature of about 45° C. for a period of about 12–14 hours. The temperature is then increased to 60° C. for one hour, then to 70° C. for one hour, and finally to 95–100° C. for about five to six hours. The reaction mixture while still hot is poured into 1 liter of cold water, and treated with 1 liter of 40 percent potassium hydroxide solution. This liberates as a free base the desired 6-methoxy-8-(1'-methyl-4'-isopropylaminobutylamino)-lepidine, of formula 6. To effect its recovery, the reaction mixture is extracted with ether, desirably with successive portions of ether. The ether extracts are combined and extracted with a buffer solution prepared by adding sodium acetate to a 10 percent solution of acetic acid until the solution gives a neutral or very slightly basic test on Congo red paper. The extraction with the buffer solution is continued until no strong coloration of the aqueous layer is observed. The combined buffer extracts are extracted with three 100 ml. portions of ether and then treated with an equal volume of 40 percent aqueous potassium hydroxide. The mixture is extracted with ether. The ether solution is dried, as over magnesium sulfate, filtered, and concentrated on a steam bath. The residue is distilled in an inert atmosphere at less than 0.5 mm. pressure with a bath temperature of about 225–250° C., and yields a purified form of the desired 6-methoxy-8-(1'-methyl-4'-isopropylaminobutylamino)-lepidine.

This may be converted to its hydrochloride, or to the correspoding 6-hydroxy compound, by the procedures set forth in Example 1.

*Example 3*

6-methoxy-8-(5' - isopropylaminoamylamino)-lepidine represented by the following formula (7)
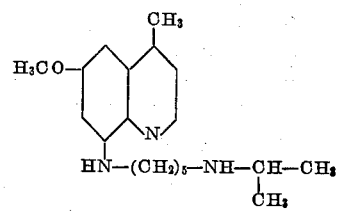

may be prepared by the procedure of Example 1, save that instead of diethylaminohexyl bromide hydrobromide, the hydrobromide of isopropylaminoamyl bromide is used. This latter compound is described by Elderfield et al., J. Am. Chem. Soc. 68, pages 1579–1584 (1946). As in Example 1, the substituted lepidine may be converted to its dihydrochloride, or may be demethylated to yield the corresponding 6-hydroxy compound.

*Example 4*

6-methoxy-8-(3' - diethylaminopropylamino) - lepidine represented by the following formula (8)
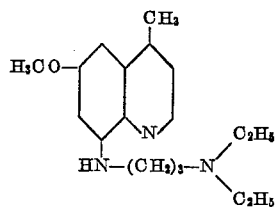

may be prepared by the procedure of Example 1, save that diethylaminopropyl bromide hydrobromide is used instead of diethylaminohexyl bromide hydrobromide. As in Example 1, the substituted lepidine may be converted to its dihydrochloride, or may be demethylated to yield the corresponding 6-hydroxy compound.

*Example 5*

6 - methoxy - 8 - (4' - ethylaminohexylamino)-lepidine, represented by the following formula (9)
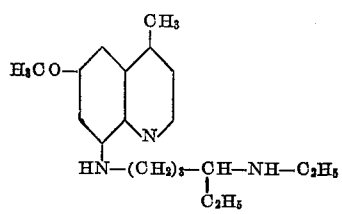

may be prepared by the procedure of Example 1, save that instead of diethylaminohexyl bromide hydrobromide, the hydrobromide of 1-bromo-4-ethylaminohexane is used. This latter compound is described by Elderfield et al., J. Am. Chem. Soc. 68, pages 1579-1584 (1946). As in Example 1, the substituted lepidine may be converted to its dihydrochloride, or may be demethylated to yield the corresponding 6-hydroxy compound.

*Example 6*

6 - methoxy - 8 - (1' - methyl - 4' - diethylaminobutylamino)- lepidine, represented by the following formula

(10)
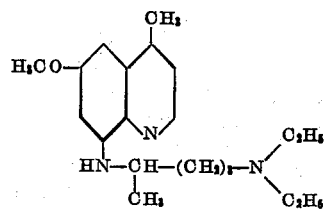

may be prepared by the procedure of Example 2, save that instead of 1-methyl-4-isopropylaminobutyl bromide hydrobromide, 1-methyl-4-diethylaminobutyl bromide hydrobromide is used. As in Example 1, the substituted lepidine may be converted to its dihydrochloride, or may be demethylated to yield the corresponding 6-hydroxy compound.

*Example 7*

6 - methoxy - 8 - (6' - butylaminohexylamino) - lepidines, represented by the following formula

(11)
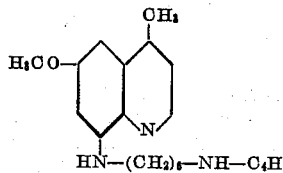

may be prepared by the procedure of Example 1, save that instead of diethylamino hexyl bromide hydrobromide, a butylamino hexyl bromide hydrobromide is used. The $C_4H_9$ radical will be either n-butyl, isobutyl, sec. butyl, or tertiary butyl, depending upon whether the n-butyl (M. P. 207–213° C.) the isobutyl (M. P. 197–201° C.), the sec. butyl (M. P. 136–139° C.), or the tert. butyl (M. P. 143–145° C.) isomer of 6-butylamino hexyl bromide hydrobromide is used. As in previous examples, the substituted lepidine may be converted to its dihydrochloride, or may be demethylated to yield the corresponding 6-hydroxy compound.

*Example 8*

By the procedures of the foregoing examples, other 6-methoxy- and 6-hydroxy-8-(alkylaminoalkylamino)-lepidines and their dihydrochlorides may be prepared, by the use of other alkylaminoalkyl halides of Formula 4 or their hydrohalides.

*Example 9*

Any of the preceding examples may be repeated, save that instead of using 6-methoxy-8-aminolepidine, other 6-alkoxy-8-aminolepidines may be used, to produce corresponding 6-alkoxy-8-(alkylaminoalkylamino)-lepidines.

*Example 10*

Any of the preceding examples may be repeated, save that instead of forming the dihydrochlorides of the substituted lepidines produced, other salts thereof may be formed, such for example as the hydrobromides, the phosphates, the citrates, etc.

I claim as my invention:

1. The new antimalarials from the group consisting of the free base represented by the following formula

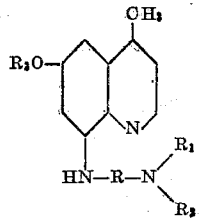

in which R is an alkyl radical having from 2 to 8 carbon atoms, $R_1$ is a member of the class consisting of hydrogen and alkyl radicals having from 1 to 6 carbon atoms, $R_2$ is an alkyl radical having from 1 to 6 carbon atoms, and $R_3$ is an alkyl radical having from 1 to 4 carbon atoms; and their salts.

2. The new antimalarials from the group consisting of the free base, comprising the 6, 8-substituted lepidine represented by the following formula

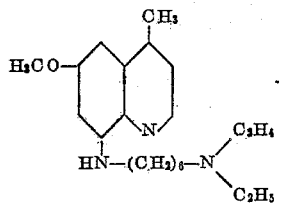

and their salts.

3. The process of producing the new antimalarials as defined in claim 1, which comprises condensing an o-nitro-p-alkoxy aniline and methylvinyl ketone with arsenic acid and concentrated sulfuric acid, to form a 6-alkoxy-8-nitrolepidine, reducing said 8-nitro compound to the corresponding 8-amino compound, and condensing said 8-amino compound with a compound of the class consisting of alkylaminoalkyl halides having the following formula

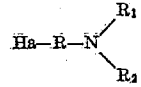

in which R, $R_1$, and $R_2$ have the same meaning as in claim 1, and Ha represents one of the halogens of the group consisting of chlorine and bromine and their hydrohalides.

KENNETH N. CAMPBELL.

REFERENCES CITED

The following references are of record in the file of this patent:

UNITED STATES PATENTS

| Number | Name | Date |
|---|---|---|
| 1,747,531 | Schulemann et al. | Feb. 18, 1930 |
| 1,806,564 | Prill et al. | May 19, 1931 |
| 1,879,538 | Schonhofer | Sept. 27, 1932 |
| 1,938,047 | Schonhofer et al. | Dec. 5, 1933 |

FOREIGN PATENTS

| Number | Country | Date |
|---|---|---|
| 267,457 | Great Britain | Mar. 27, 1927 |
| 388,087 | Great Britain | Feb. 23, 1933 |

OTHER REFERENCES

Hollins: "The Synthesis of Nitrogen Ring Compounds" (D. Van Nostrand; New York; 1924), page 252.

Williams: "Chemotherapy of Malaria," page 86 (published by Lederle Laboratories, Inc., New York, N.Y., June 1941).

Shriner et al.: "Synthetic Antimalarials," page 18 (published at Bloomington, Indiana, 1941).